(12) United States Patent
Weijand et al.

(10) Patent No.: US 6,329,929 B1
(45) Date of Patent: Dec. 11, 2001

(54) TELEMETRY SYSTEM WITH PHASE-LOCKING NOISE SUPPRESSING RECEIVER

(75) Inventors: Koen J. Weijand, Rockanje; Richard Houben, Berg en Terblijt, both of (NL)

(73) Assignee: Medtronic Inc., Minneapolis, MN (US)

( * ) Notice: Subject to any disclaimer, the term of this patent is extended or adjusted under 35 U.S.C. 154(b) by 0 days.

(21) Appl. No.: 09/217,127

(22) Filed: Dec. 21, 1998

(51) Int. Cl.[7] .................................................... G08C 19/16

(52) U.S. Cl. ................... 340/870.25; 128/903; 375/340; 607/32

(58) Field of Search .......................... 340/870.25; 607/30, 607/31, 32, 60; 128/903; 375/326, 340, 371, 376, 373

(56) References Cited

U.S. PATENT DOCUMENTS

| | | | |
|---|---|---|---|
| 4,944,299 | * | 7/1990 | Silvian ................................ 128/903 |
| 4,947,407 | * | 8/1990 | Silvian ................................ 375/340 |
| 5,264,843 | * | 11/1993 | Silvian ................................ 128/903 |
| 5,448,997 | | 9/1995 | Kruse et al. ........................ 128/697 |
| 5,466,246 | | 11/1995 | Silvian ................................ 607/32 |
| 5,769,876 | * | 6/1998 | Silvian ................................ 607/32 |
| 5,774,501 | * | 6/1998 | Halpern et al. ..................... 607/32 |
| 5,999,857 | * | 12/1999 | Weijand et al. .................... 128/903 |

OTHER PUBLICATIONS

Introduction to Radar Systems (2nd edition)—Merril I. Skolnik), 1980, pp. 176–178 & 388–392.

* cited by examiner

Primary Examiner—Michael Horabik
Assistant Examiner—Timothy Edwards, Jr.
(74) Attorney, Agent, or Firm—Thomas F. Woods; Michael J. Jaro; Thomas G. Berry

(57) ABSTRACT

There is provided a telemetry system with a receiver which enables detection of pulsed high frequency data (hf) signals in a manner which suppresses noise which may be present within the high frequency bandwidth. The transmitter carrier, which may be subject to some instability, is encoded at a symbol rate which is generated at a lower frequency than the hf, but which is reliably stable. The receiver detects the phase of each received hf pulse, and generates a phase-locked signal which is synchronized to the transmitter symbol signal. The phase-locked signal in turn is used to demodulate the received pulsed signals. In a specific DSP embodiment, the phase-lock loop has a numerically controlled oscillator which has a center frequency which corresponds to the aliased phase difference between the hf carrier phase and the phase of each pulse, thereby obtaining a signal which carries information as to the exact symbol rate. This information is used either to calculate the timing of a narrow window which gates a pulse detector coincident with each next expected symbol time, or to trigger generation of a replica signal which is used in the detect circuit, thereby providing high resolution detection of the pulses and good noise rejection.

24 Claims, 6 Drawing Sheets

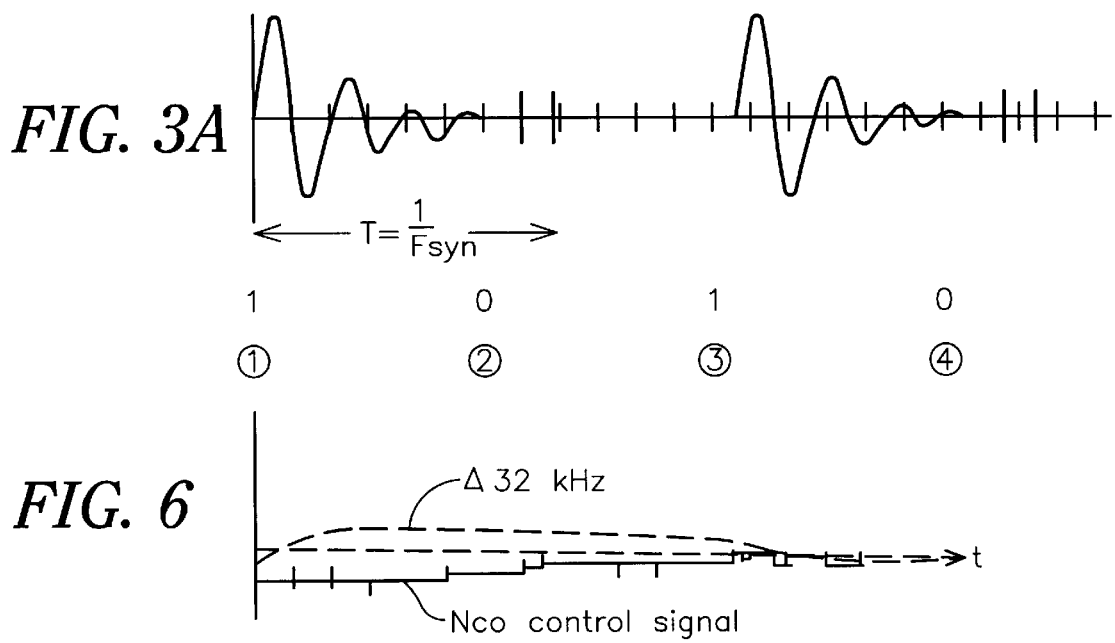

TELEMETRY SYSTEM WITH PHASE-LOCKING NOISE SUPPRESSING RECEIVER

FIELD OF THE INVENTION

This invention lies in the field of telemetry systems and, in particular, telemetry systems having a transmitter characterized by an unstable carrier which is modulated with symbol data at a crystal-referenced symbol rate to provide pulsatile RF signals; and a receiver which demodulates by generating a carrier phase-locked symbol signal which is used for demodulating the symbol data.

BACKGROUND OF THE INVENTION

In many telemetry system applications, and in particular in the field of medical devices, the system must ensure the ability to detect data signals in the presence of significant noise. Often the noise may have components within the frequency band of the telemetry signal, making the detection process difficult. It is known in telemetry systems to use window tracking to detect pulses. In such systems, a detection window is created centered around the next expected pulse, to time discriminate against noise and thereby enable examination of the incoming signal. However, generally in such systems the time of the detected pulse is not sharply defined, and the window needs to be long enough to both "see" the pulse and allow for drift in the pulse position. Consequently, it is very difficult to separate out noise from signal in such time-based systems. Other systems have been employed with varying success, but it remains difficult to accurately and reliably receive pulsatile data in a noisy environment. An acceptable receiver, e.g., for frame-based uplink telemetry, using DSP or any other embodiment, must provide a simple yet very reliable method of discriminating the noise likely in the environment in which the system operates.

A problem which comes into play in telemetry systems involving implanted devices is that the carrier is frequently of an unstable and inaccurate nature. In many such systems the carrier is a continuous wave, i.e., a sinusoidal carrier, such that the phase information of the carrier can be retrieved by multiplying it with sine waves and cosine waves (complex demodulation). However, if the type of carrier is a complex multi-frequency wave form, e.g., monopolar chirps, etc., the necessary phase information is not easily retrieved, and an improved form of phase detection is required. Generally, where the telemetry system uses pulsatiles that can be regarded as short spread spectrum RF bursts with wide band signal properties, the receiver must also obtain information about the characteristics of the signal in order to effectively detect it in the presence of noise.

In view of the above, it is seen that what is needed in the art is an improved telemetry system, and in particular, a telemetry system with an improved noise-suppressing telemetry receiver. In particular, the need is to provide demodulation of pulsatile high frequency signals of various forms, e.g., multi-frequency wave forms such as BPSK signals, exponentially decaying sinusoidal signals, etc. In such telemetry systems, pulsatile RF signals are modulated in the transmitter by a data-carrying symbol signal with an accurate symbol rate. This invention uses the inherently accurate symbol rate as a basis for deriving the phase and other characteristics of the transmitted signal, for use in demodulating the RF signals and obtaining the transmitted data.

Further, telemetry receivers for uplinking data for implanted devices such as cardiac pacemakers, can utilize the efficiency and reliability inherently provided by DSP implementation. Examples of such inherent power are seen in cross correlation detection implemented by a finite impulse response (FIR) digital filtering structure, and quadrature demodulation. The potential of DSP based processing in fields such as cardiac pacing systems has been demonstrated. See U.S. Pat. Nos. 5,448,997 and 5,446,246. This invention may utilize the processing power of DSP to enable an improved time discrete system design for suppressing noise and reliably detecting data uplinked from, e.g., an implanted medical device, but also embraces other state-of-the-art embodiments.

SUMMARY OF THE INVENTION

It is an object of this invention to provide a telemetry system having a receiver for noise free reception of uplink telemetry signals, suitably utilizing DSP-based technology. It is a more specific object to provide such a receiver to reliably receive uplink telemetry signals in an environment such as is present with a cardiac pacing system where there is inband noise generated by monitors and other sources, and where the transmitted carrier is unstable but is modulated by a stable symbol signal.

In accordance with the above objects, there is provided a telemetry receiver which utilizes a digital signal processor or other processing circuitry, and provides a technique for developing in the receiver a phase-synchronized replica of the transmitted data symbol signal for use in demodulating the RF signals. In particular, for pulsatile high frequency signals, a synchronized symbol phase signal is utilized for carrier replica detection of the uplinked data, thereby providing data detection even in the presence of noise having frequencies within the receiver bandwidth.

Most current modulator/demodulator telemetry systems use sinusoidal carriers. In such situations that are characterized by moderate or light noise, the phase information of the carrier can be retrieved by complex demodulation, i.e., multiplying the carrier with sine waves and cosine waves. However, the problem becomes more difficult when the carrier is not continuous, but is pulsatile, and even multi-frequency. In continuous carrier spread-spectrum systems, the demodulation is carried out by an early carrier replica signal and a late replica signal to get phase-related information, with a technique called early/late synchronization. In the system of this invention, the frequency, or rate of the incoming pulsatile RF signals is known, but the character of the incoming wave shape may be relatively unknown. Particularly for telemetry signals sent from an implanted device, such as used in biomedical devices such as pacemaker, neurostimulators and the like, the signals have a pulsatile nature. The telemetry uplink signal can be regarded as a short burst of a multi-frequency signal, and is effectively detected in the presence of noise by generating and storing replicas of the pulsatile signals, and providing a correlator or matched filter demodulator. Once the replica has been obtained, the modulation is performed by obtaining a phase locked symbol signal in the receiver, and using this to time the demodulation of the pulsatile symbols.

In a specific preferred embodiment, a free running quadrature oscillator is synchronized with the demodulated RF signal such that the phase difference with respect to each symbol is reduced to zero. When this is achieved, the receiver system is locked, and the locked oscillator signal is representative of the symbol clock in the transmitting device. With the symbol phase available, succeeding data symbols, or pulses, are predicted with great accuracy, and a very narrow detection window, or slot, is generated for detection of the next symbol. Alternately, the locked phase signal is used to generate a symbol replica signal for use in demodulation. By this means, other interfering signals are suppressed, regardless of their frequency. Another advantage that is obtained is the ability to reduce the DSP load to a minimum between predicted symbol detection slots, as the DSP can be turned off outside these slots.

BRIEF DESCRIPTION OF THE DRAWINGS

FIG. 3A is a timing diagram illustrating transmitted pulsatile RF data signals in a specific embodiment of the invention.

FIG. 6 is a timing, diagram showing the control signal of the clock NCO plotted together with the symbol frequency error for the illustrated specific embodiment.

DESCRIPTION OF THE PREFERRED EMBODIMENTS

Figure 1:
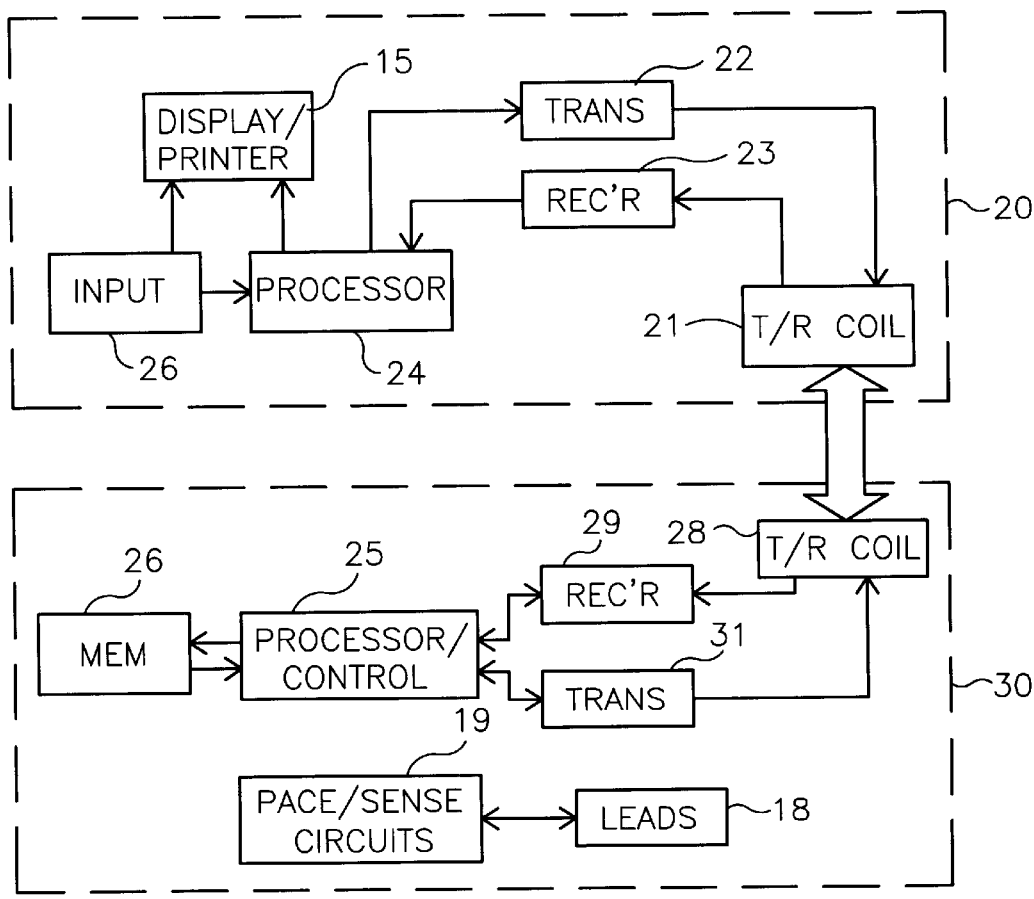
FIG. 1 is a system block diagram, showing an implanted device with a telemetry system providing two-way communication between the two devices.

Referring now to FIG. 1, there is shown a block diagram of a system incorporating the telemetry receiver of this invention. While the invention is described in the context of an external device which receives telemetry signals from an implanted medical device, the invention is not limited to the environment of medical devices.

An external device, such as a programmer used in cardiac pacing systems, is illustrated at 20. The device picks up data at t/r coil 21, which data has been telemetered from another device illustrated at 30, e.g., an implanted cardiac pacemaker. The data which is uplinked to device 20 is inputted to processor block 24, where it may be stored, analyzed, etc. The data can be displayed by any suitable display or printer, as shown at 15. Such programmer devices also have input capability, as by receiving tapes, discs, or data inputted by keyboard, as shown at 16. Device 20 also has a transmitter 22 for sending data to the implanted device 30. The portions of implanted device 30 that are important to this invention are illustrated within dashed block 30. The transmitter 31 is controlled by block 25, and transmits encoded data through t/r coil 28 to the external device 20. In practice, the device 30 can also receive data from external device 20, through receiver 29 which is connected to processor 25. Processor 25 is also suitably used to control operation of pace sense circuits 17, which transmit pacing signals to a patient's heart through leads 18, and receive heart signals for processing. Block 25 suitably uses a microprocessor and associated memory 26, in a know fashion.

Figure 2A:
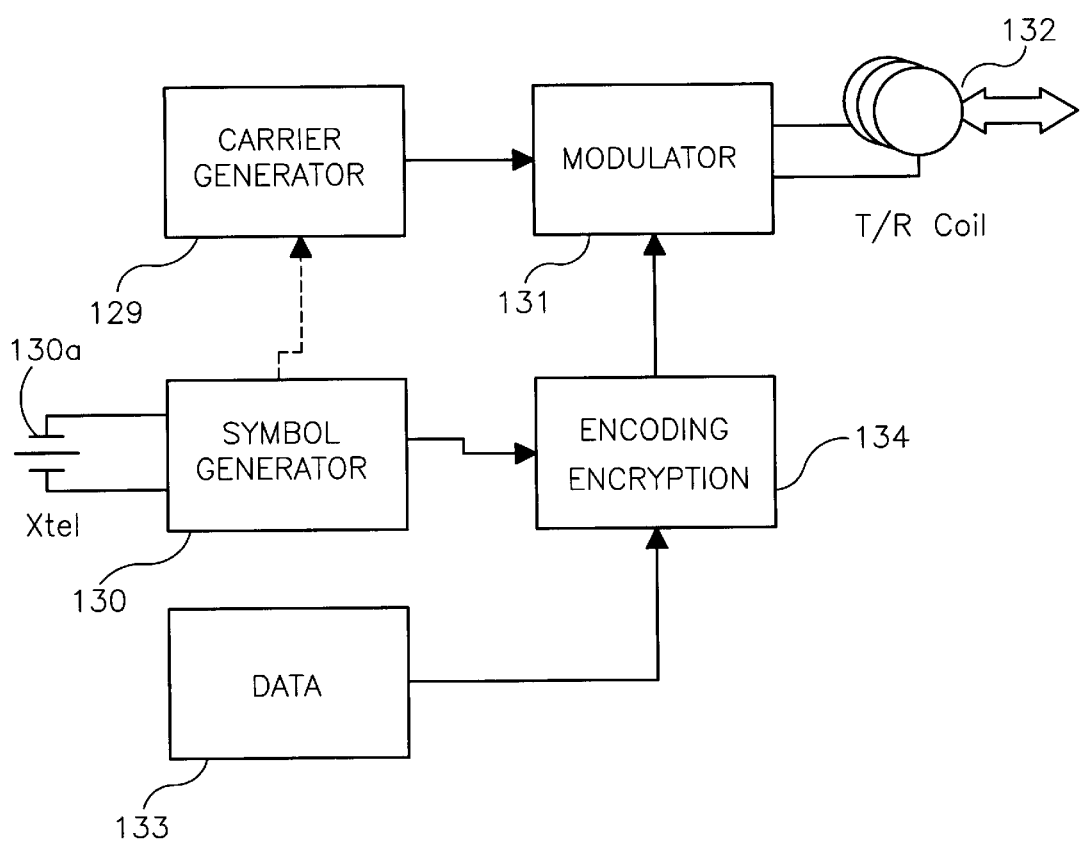
FIG. 2A is a block diagram of the primary components of a transmitter for a telemetry system in accordance with this invention.

Referring now to FIG. 2A, there is shown a block diagram of a transmitter as used in a telemetry system in accordance with this invention. A carrier generator is shown at 129, the output of which is connected to modulator 131. The carrier generator provides a high frequency signal, normally in the area of 175 kHz. Generator 129 provides a relatively unstable carrier, in that the frequency of the carrier may be subject to small variations which are nonetheless important in terms of the problems posed for demodulation. Symbol generator 130, shown incorporating a crystal 130a, provides a highly stable relatively low frequency symbol signal, e.g., in the area of 32 kHz. The symbol signals from generator 130 are transferred to block 134 for encoding, based on data derived from block 133, in a conventional manner. The symbol generator signal may also be used to control the carrier generator, as in multi-frequency systems. The encoded symbol signal coming from block 134 is used in modulator 131 to modulate the carrier, and the resulting telemetry signal is transmitted from t/r coil 132. For purposes of illustration, the transmitter is presumed to be in a relatively remote device, i.e., an implanted pacemaker, and the signal is received in an external device.

Figure 2B:
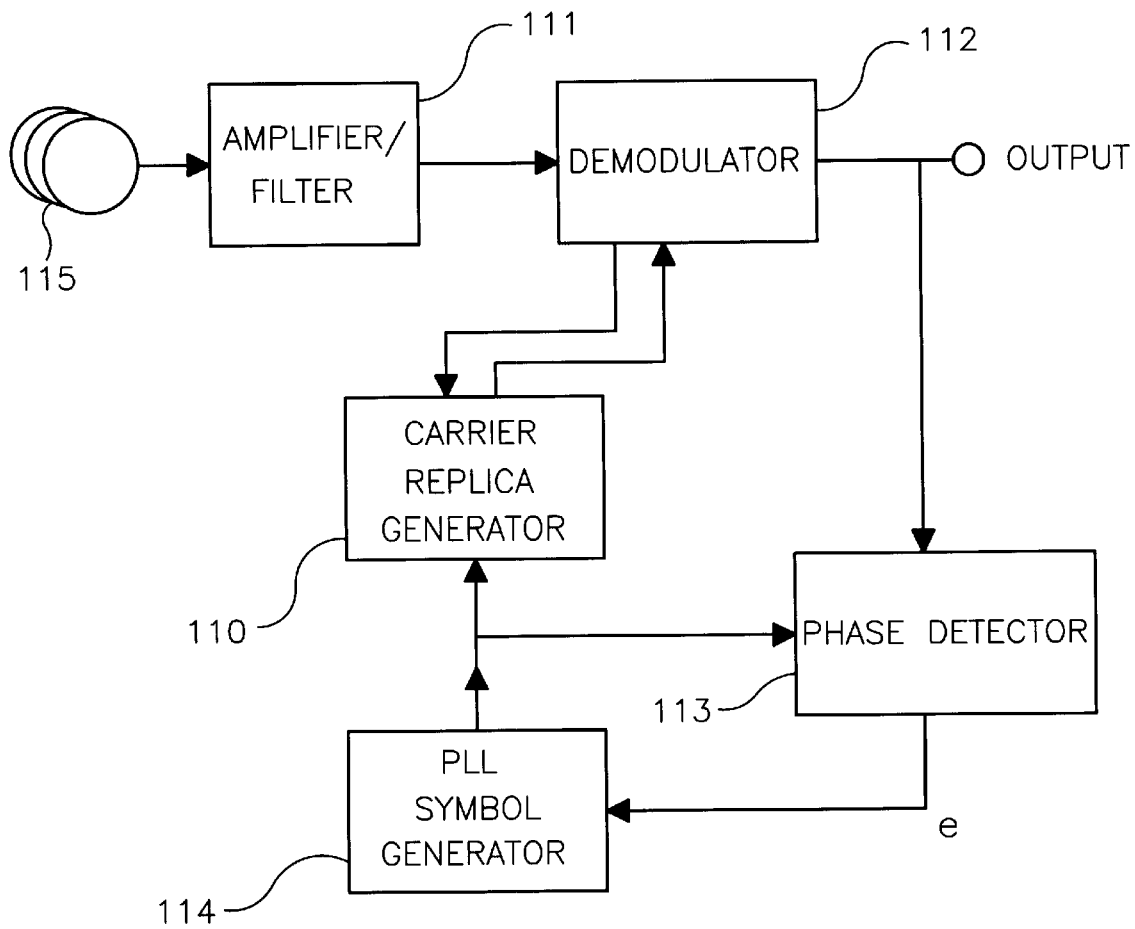
FIG. 2B is a block diagram of the primary components of a receiver for a telemetry system in accordance with this invention.

Referring now to FIG. 2B, there is shown a block diagram of the primary components of a telemetry uplink receiver in accordance with this invention. The signal, with the unstable carrier, and coded suitably with pulsatile data, is amplified and filtered at block 111, and then connected to demodulator 112. The circuit 112 is suitably a correlator demodulator, or a matched filter demodulator where the optimum filter signal is derived from the carrier signal itself. The telemetry uplink signal is in the form of a short burst of a single frequency or multi-frequency carrier; the received signals have the characteristic that the carrier has relatively inaccurate frequency components or shape, but the phase relationship to the transmitter symbol frequency is accurate and stable. The modulation may be in the form of bi-phase shift keying (BPSK); dual frequency sinusoids; exponential decaying sinusoidal signals; and other forms of uplink signals that have signal properties designed to discriminate against in-band noise components for monitors and the like. For an example of such uplink signals, see U.S. application Ser. No. 08/768,605, filed Dec. 18, 1996, (Attorney Docket No. P-5088, 5089), assigned to the same Assignee and incorporated herein by reference.

The output signal, taken from the output demodulator 112, is connected to phase detector 113, which generates a signal representative of the detected signal phase compared to a feedback signal derived from phase lock loop symbol generator 114. Blocks 113 and 114 constitute a phase locked loop (PLL). The difference, or error signal from detector 113, is inputted to the symbol generator, which comprises a controllable clock generator which becomes locked or synchronized to the transmitted symbol signal. The output of symbol generator 114 is also connected to carrier replica generator 110, and triggers delivery of a signal which is a replica of the carrier signal to demodulator 112, for use in correlation or matched filter demodulation. To illustrate, taking the sine wave as a simplest form, a replica of a sinusoidal carrier is stored at block 110, and delivered to demodulator 112 when a locked-phase signal is delivered from the output of generator 114. Thus, for simple amplitude detection of an incoming pulse, a replica of the carrier is first stored in 110 to start the detection, and then used synchronously for correlation demodulation, to provide improved noise suppression. As seen in a later example, the use of a timing window can be used as part of the PPL to update the phase-locked symbol signal at precisely the time when a pulse is expected or actually received. Additionally, the receiver is made sensitive to signals only when a signal is expected, based on the predictive accuracy of the crystal frequency. In an embodiment using DSP, calculation efficiency can be obtained by enabling the DSP to be active only when the timing window is being timed out.

FIGS. 3A, 3B and 4–6 illustrate a specific embodiment which is within the scope of this invention. This embodiment is directed to a decaying sinusoid, and in particular an embodiment which aliases the phase differences between the high frequency transmitted signal and the phase of each received pulse. This specific embodiment is provided as illustrative of the concepts as discussed in connection with FIGS. 2A and 2B, and is not limited to the below-disclosed specific embodiment.

Figure 3B:
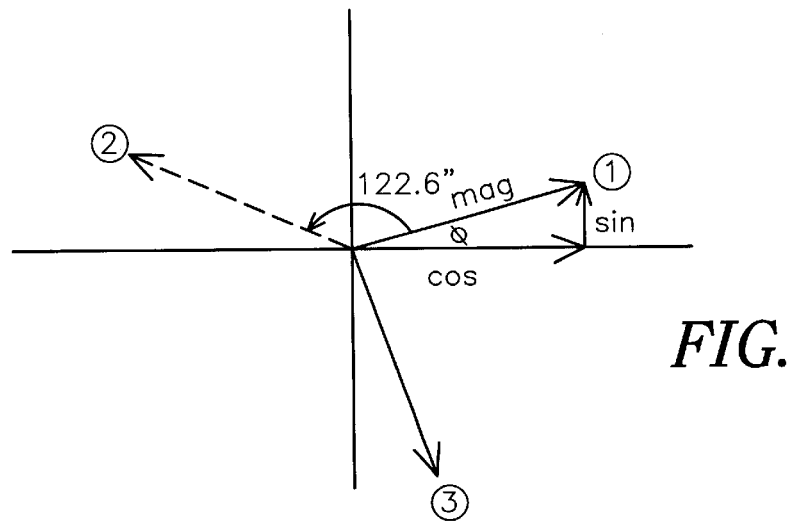
FIG. 3B is a solution vector diagram showing the solution vector representing the RF carrier phase at each of three consecutive symbol times, illustrating the aliasing effect of the symbol phase.

Referring, now to FIGS. 3A and 3B, there are shown diagrams which illustrate the relationship of the carrier and the symbols. FIG. 3A is a timing diagram showing transmitted pulsatile data, where the symbol rate $F_{sym}$ is much less than the carrier frequency. In an illustrative embodiment, the carrier frequency is 175 kHz, and the symbol frequency is 32,768 Hz (sometimes referred to hereafter as the 32 kHz symbol rate, or pulse data rate); the symbol duration is short compared to the symbol-to-symbol interval. The ratio of the two frequencies is 5.34057, meaning that there are 5.4057 carrier cycles in every symbol position. Thus, the carrier rotates $5*2\pi+0.34057*2\pi$ every symbol. This results in a relative advance of the carrier vector of 122.6 degrees each symbol, as indicated in the advance of the vector from position 1 to position 2, and from position 2 to position 3 as seen in FIG. 3B. The 122.6 degree advance per symbol corresponds to a relative vector rate of 11,160 Hz, as per the equation $$175 kHz - 5*32768 = 11160.$$

Based on the above observations, if one samples the carrier every symbol, and assuming the symbol rate is constant at 32.768 kHz, the carrier vector appears to be rotating at a rate of 11,160 Hz. Stated alternately, the sampled solution vector represents aliasing at the 11,160 rate. As shown in FIG. 3B, at the second symbol time, the vector will have advanced to correspond to the dashed line with a "2" at its end (the dashed line indicating that no symbol was generated, representing a "0" as shown in FIG. 3A); and at the third symbol time, the vector has advanced another 122.6 degrees. If the symbol signal were absolutely steady, this information could be used to predict the timing of the next symbol. But, the problem, of course, is that the 32 kHz signal is not exactly constant, and may vary plus/minus from the predetermined sample rate, e.g., 32.768 kHz. It is this variation which can make "finding" the symbol difficult, as a window established at a constant interval corresponding to 32.768 kHz would either lose the symbol due to the variations, or the window would have to be so wide that the signal to noise ratio would be too low to achieve reliable detection.

An important part of this embodiment, and this invention generally, is to reliably detect the phase of the RF carrier signal, and use this to extract the underlying symbol clock, e.g., 32.768 kHz, from the RF. The detection scheme of this invention utilizes a quadrature demodulator to detect each symbol and to determine the carrier phase. A phase-locked loop (PLL) is built around a numerically controllable oscillator with a center frequency of 11,160, i.e., the aliasing frequency of the phase at each symbol. The vector phase of each "one" data symbol, e.g., the phase with respect to the 175 kHz carrier signal, is used to synchronize the phase-locked loop to the underlying symbol clock. When the system locks, the locked oscillator is representative of the symbol clock, and provides the necessary information. The system translates the aliased phase variations into symbol intervals, which are used for controlling demodulation.

Figure 4:
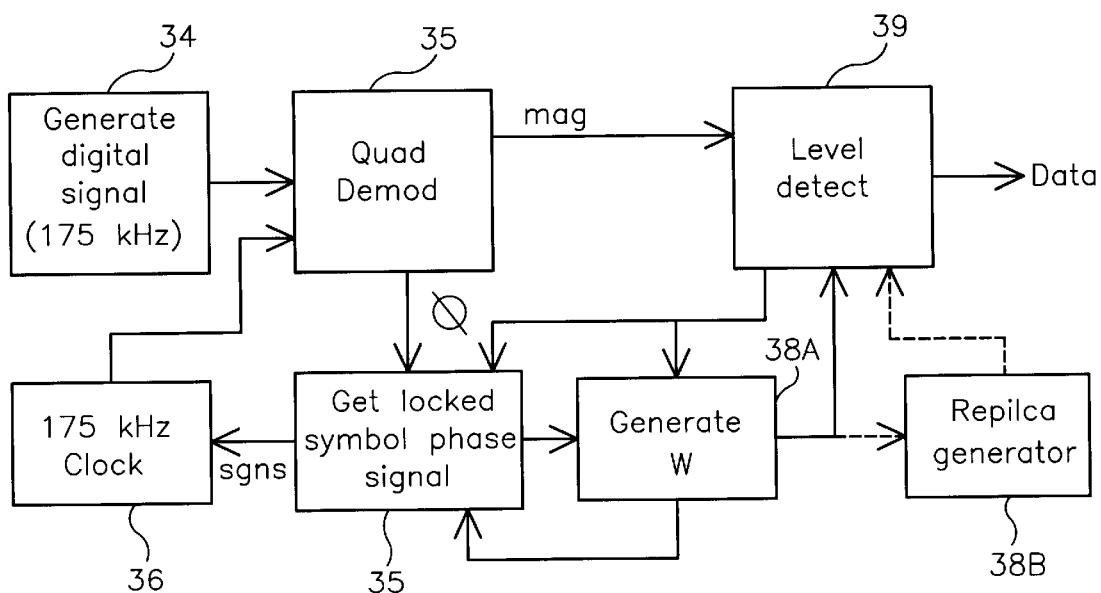
FIG. 4 is a simplified block diagram of a receiver in the illustrated specific embodiment of this invention.

The principle of using a locked symbol phase signal is illustrated in FIG. 4, which is a simplified block diagram of a specific embodiment of the telemetry receiver, corresponding to block 21 of FIG. 1. At 34, the 175 kHz carrier is received and translated into a digital signal. The circuitry of this block suitably includes a receiving coil, amplifier, filter and A/D converter. The digital signal is coupled to block 35. Block 35 provides quad demodulation of the 175 kHz signal, which results in magnitude and phase signals each time there is a symbol transmitted. The phase output is inputted to circuitry illustrated at 37, for extracting from the demodulated signal a signal representative of symbol phase, i.e., for obtaining a signal which is in phase with the symbols as generated in the transmitter at block 30. The output of circuit 37 is a signal which represents the start of the next burst, or symbol, based on the phase-synchronized signal which has been developed. As is discussed in connection with FIG. 5, a phase-locked loop circuit is used, where the phase error is sampled each time a symbol is level detected at block 39. The locked symbol phase signal is used at 38A to generate a very short window W, which in turn gates on level detector 39 to coincide with the start of the next data symbol. Alternately, the window signal, or the symbol signal from circuit 37, is used to trigger replica generator 38B, the output of which is connected to level detector 39 (which may be a matched filter detector). The locked signal is also used to synchronize 175 kHz clock 36, which provides sine and cosine signals to quad demodulator circuit 35. Detecting the phase signal in the locked situation thus enables suppression of other interfering signals that may have a similar frequency, i.e., noise in the same frequency band as the RF signal is suppressed anyway. Another advantage is that the DSP circuits can be turned off between predicted symbols, thereby reducing DSP load.

Figure 5:
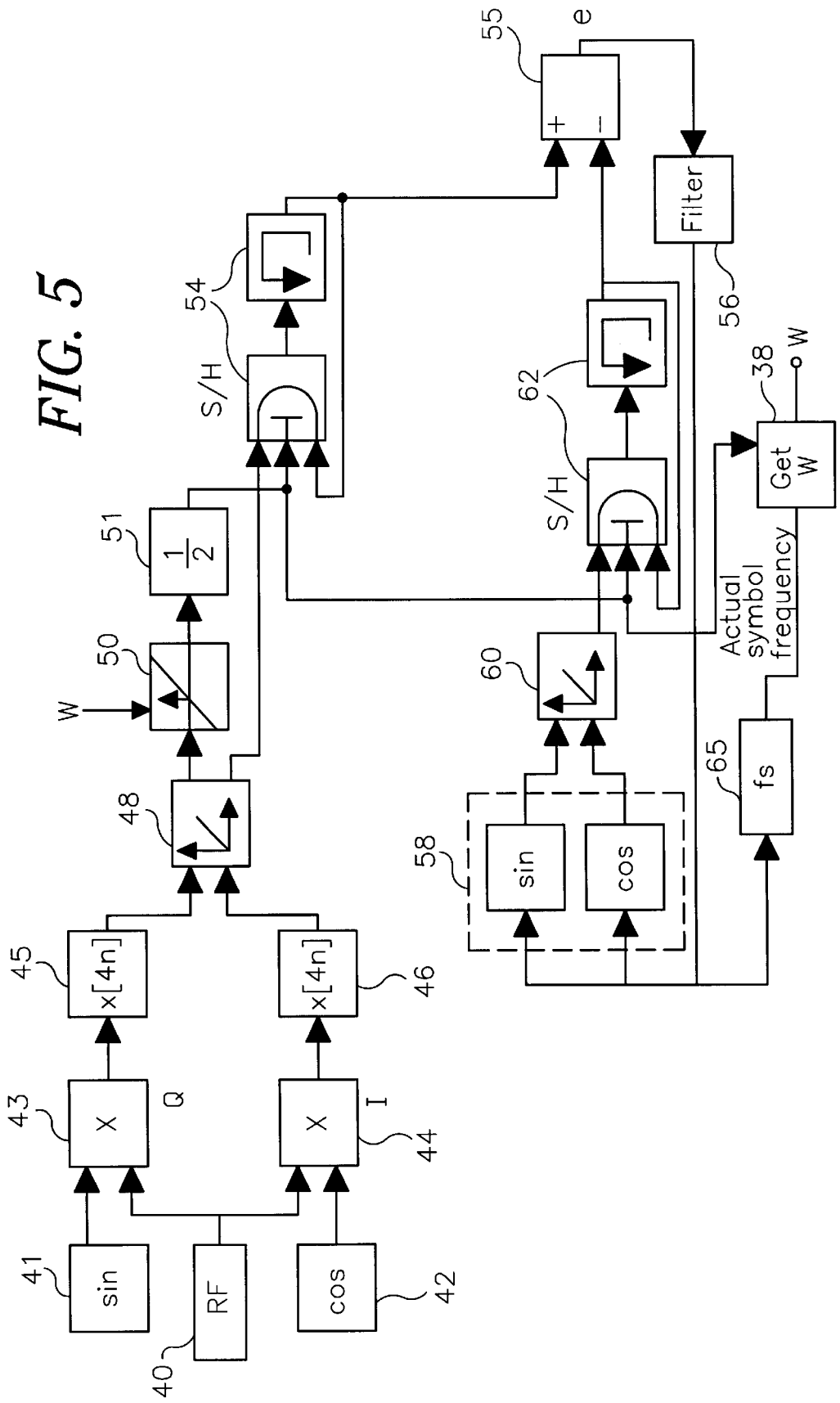
FIG. 5 is a detailed block diagram of the quadrature demodulator and phase determination circuits of the receiver in the illustrated specific embodiment of this invention.

Referring now to FIG. 5, there is shown a block diagram of a preferred quadrature demodulation and phase determination circuit, for providing the information necessary for predicting the occurrence of the next symbol. The processing circuits of this Figure are provided, for example, by Texas Instruments processor TMS320C549. RF head 40 is a conventional coil for picking, up the transmitted RF signal, and suitably has appropriate filter and amplifier circuitry for providing the signal. RF head 40, in a preferred embodiment, also includes a digitizer for producing a digital signal for use by DSP circuits, e.g., it samples the 175 kHz signal at a 700 kHz rate. The digital RF signal, which carries the symbol data, is inputted to a quadrature demodulator which is made up of circuits 41–46, to provide the quad I and Q components. An NCO oscillator is depicted as block 41, which provides a 175 kHz digital clock sine wave; and block 42, which provides a 175 kHz digital cosine wave. The carrier is multiplied by the clock sine at block 43, and by the cosine at block 44. These multiplication signals are then followed by a four point moving average filter (FIR), shown at 45 and 46 respectively, and the resulting I and Q signals are operated on at cartesian-to-polar convertor block 48 to provide respective magnitude and phase signals. In the circuit illustrated, detection takes place on the magnitude component by level detection, as seen at block 50. However, it is noted that phase detection is also possible, since the phase component is stable, i.e., nearly constant, during the course of the pulse.

Referring again to the output of block 48, the phase output is connected to sample and hold circuit 54, as shown. The magnitude output is level detected at 50, delayed at block 51, and connected to trigger circuit 54 to sample the phase. Thus, the symbol phase is obtained only when there is a data "one", and held until the next data one again triggers the sample and hold circuit to capture a new phase value. The sampled phase signal is inputted to a PPL which is made up of circuits 55, 56, 58, 60 and 62. Circuit 55 is a differential circuit which subtracts from the new phase value a phase value representative of the numerically controlled local oscillator, NCO 58, which runs at a center frequency of 11160 Hz, i.e., the aliasing frequency. The difference, or error signal shown as "e", is low pass filtered through filter 56, suitably a 100 Hz cutoff filter. This filtered error signal is representative of the difference between the sampled symbol phase and the phase of the 11160 hz oscillator, and is inputted to numerically controlled oscillator 58. Oscillator 58 is shown as providing sine and cosine outputs. As an example, the oscillator frequency is controlled at 20 Hz per volt, and thus any non-zero value of e changes the phase output which is provided by converter 60. The phase output of the NCO 58 is inputted to sample and hold circuit 62, which is triggered by the detect signal from circuit 51; and the output from S/H circuit 62 is connected as the negative input to difference circuit 55. Note that since the positive input to difference circuit 55 was delayed by one symbol interval at circuit 51, the adjusted phase output from 58,60 corresponds in time to the phase output from S/H circuit 54. When the loop is locked, the phase difference e goes toward a constant. Thus, if the symbol generator in the transmitter is stable at exactly its center frequency, e.g., 32,768 Hz, then e is zero; if it is stable at a different frequency, then e is a constant.

The filtered phase error signal, e, is inputted to function block 65, which calculates the following function (using the numbers of the illustrative example, and where e is given in the frequency equivalent of the phase difference):

$$f_s=[175,000-(11160+e*5]/5,$$

which is the value of the actual symbol frequency being generated in the transmitter. The inverse of this symbol frequency is calculated at circuit 38, and based on this and the timing of detected symbols, the timing of the next window W corresponding to the next symbol is calculated; the W gate signal is connected to circuit 50, to accurately gate through the demodulated signal only for a short duration corresponding to the data symbol. This information is also used, as shown in FIG. 4, to control the 175 kHz NCO circuit 36(seen in FIG. 5 as generators 41, 42).

Referring to FIG. 6, there are shown timing diagrams plotting the NCO control signal, which represents the phase error, and the value of "delta 32 Khz", which represents the difference between the derived actual symbol frequency and 32,768 Hz; the time axis is in milliseconds. The phase error curve shows updates at the time (sample and hold) of detected symbols. For the time illustrated, the actual 32 kHz signal is greater than 32,768 Hz most of the time, but drifts toward the 32,768 Hz value. The delta 32 kHz signal shows the delta value decreasing toward zero as the control signal decreases in amplitude.

There has thus been described a very simple but elegant, and very reliable circuit for detecting data transmitted with an RF carrier. The level detector is enabled to be a very simple circuit, i.e., it simply looks for the first wave that has an amplitude above a certain level, which is easily accomplished. The symbols are thus very easy to detect, after locking onto the 32K signal. The window can be very narrow, thus eliminating most noise and achieving a very high probability of no false positives.

As described above, the invention embraces other detector, or modulator circuits, e.g., correlation and matched filter-type circuits as well as a replica generator which is triggered synchronously with the transmitter symbol signal, by a signal derived from a phase-lock loop circuit in the receiver.

What is claimed is:

1. A telemetry system for receiving and demodulating transmitted pulsatile high frequency signals, said signals being modulated by a symbol signal having a data symbol rate much less than said high frequency, comprising:

demodulator means for receiving said high frequency signals and for deriving data symbols from said high frequency signals;

phase means for determining the phase of each of said derived symbols;

symbol means for developing a symbol signal synchronized in phase with said derived symbols; and feedback means for generating feedback signals in phase with said symbol signal and for connecting said feedback signals to said demodulator for use in demodulating said high frequency signals.

2. The system as described in claim 1, comprising a phase lock loop, said phase lock loop comprising said phase means and said symbol means.

3. The system as described in claim 2, wherein said feedback means comprises carrier replica generator means for generating a replica signal in phase with each symbol of said symbol signal, said replica signal being a replica of the transmitted high frequency signal.

4. The system as described in claim 3, wherein said feedback means comprises storage means for storing said replica signal.

5. The system as described in claim 4, wherein said storage means comprises storage of a sinusoidal carrier.

6. The system as described in claim 4, wherein said storage means comprises storage of a pulsatile monopolar signal.

7. The system as described in claim 4, wherein said storage means comprises storage of a chirp.

8. The system as described in claim 4, wherein said storage means comprises means for storing a replica of a bi-phase shift keyed signal.

9. The system as described in claim 4, wherein said storage means comprises means for storing a replica of an exponentially decaying sinusoidal signal.

10. The system as described in claim 1, wherein said feedback means comprises window means for generating window signals which are substantially time coincident with each symbol period of the transmitted high frequency signals.

11. The system as described in claim 3, wherein said demodulator means comprises comparing means for comparing, said feedback signal with said high frequency signal.

12. The system as described in claim 1, wherein said symbol means comprises a controllable clock generator with a center frequency of about the predetermined symbol generator rate of said implanted device, and means for locking said clock generator to said symbol signal.

13. A telemetry system for transmitting data from a remote device to a receiving device, said system having a transmitter in said remote device and a receiver in said receiving device, said transmitter comprising a carrier generator for generating a high frequency carrier signal; data means for providing pulse data;

symbol means for generating a relatively low frequency symbol clock signal;

modulating means for modulating said carrier signal to encode it with said data at a rate corresponding to said clock signal so as to provide pulsatile high frequency signals, and transmitting means for transmitting said pulsatile high frequency signals;

said receiver comprising demodulate means for demodulating said transmitted pulsatile high frequency signals, said demodulate means having, circuit means for receiving a feedback signal carrying information used in demodulating said pulsatile high frequency signals;

phase lock means for deriving from said demodulated signals a synchronized signal which is synchronized with said symbol clock signal; and symbol feedback means for generating a feedback signal in sync with said symbol clock signal and inputting it to said demodulate means.

14. The system as described in claim 13, wherein said symbol feedback means comprises replica means for providing a signal which is a replica of the transmitted pulsatile high frequency signal, and further comprising timing means for timing said feedback signal to substantially coincide with each received pulsatile high frequency signal.

15. The system as described in claim 14, wherein said phase lock means comprises a phase lock loop circuit, said phase lock loop circuit comprising a phase detector for detecting the phase of each received said pulsatile high frequency signal.

16. A telemetry receiver for receiving and detecting transmitted pulsatile high frequency signals, said pulsatile high frequency signals being in the form of a high frequency signal modulated with a train of data symbols generated coincident with a symbol clock having a symbol rate less than said high frequency, and wherein the presence of a said symbol produces a said high frequency signal, comprising:

High Frequency (hf) means for receiving said high frequency signals;

detection means for detecting the occurrence of said high frequency signals, said detection means having enabling means for enabling its operation substantially coincident with each received pulsatile high frequency signal;

phase means for determining the phase of said high frequency signals at the time of detection of each said signal;

Phase Locked Loop (pll) means for generating a continuous signal which is phase-locked to the determined phase of said signals;

calculating means for determining from said continuous phase-locked signal substantially when the next symbol is due to be generated; and said enabling means having demodulate means for generating a demodulating signal in phase with each received high frequency signal symbol.

17. The telemetry receiver as described in claim 16, wherein said hf means comprises an analog to digital converter, and comprising a digital signal processor for providing said detection means, said phase means, said pll means, said calculating means and said enabling means.

18. The telemetry receiver as described in claim 17, comprising a quad demodulator for determining the magnitude and phase of each said received high frequency signal.

19. The telemetry receiver as described in claim 18, wherein said phase means comprises a sample and hold circuit which obtains and holds a sampled phase value for each detected high frequency signal.

20. The telemetry receiver as described in claim 19, wherein said detection means comprises a level detector.

21. The telemetry receiver as described in claim 19, wherein said pll means comprises a numerically controlled oscillator with a center frequency which corresponds to the aliased phase advance of said high frequency signal relative to each symbol clock.

22. The telemetry receiver as described in claim 21, wherein said pll means comprises error means for determining an error signal representative of the phase difference between each said sampled signal and the numerically controlled oscillator signal at each said hf signal detection.

23. The telemetry receiver as described in claim 22, comprising control means for controlling said numerically controlled oscillator with said error signal.

24. The telemetry receiver as described in claim 23, wherein said quad demodulator comprises a clock generator for generating sine and cosine signals at said high frequency rate, and sync means for numerically controlling said clock as a function of said error signal.

* * * * *

UNITED STATES PATENT AND TRADEMARK OFFICE
CERTIFICATE OF CORRECTION

PATENT NO.    : 6,329,929 B1  
DATED         : December 11, 2001  
INVENTOR(S)   : Weijand et al.

It is certified that error appears in the above-identified patent and that said Letters Patent is hereby corrected as shown below:

Column 8,
Line 55, change "comparing, said" to -- comparing --.

Column 9,
Line 10, change "having, circuit" to -- having circuit --.

Signed and Sealed this

Eighteenth Day of March, 2003

JAMES E. ROGAN
*Director of the United States Patent and Trademark Office*